United States Patent
Wiinikka et al.

(10) Patent No.: US 8,961,138 B2
(45) Date of Patent: Feb. 24, 2015

(54) PREVENTING ROTATION OF A FIXED RING OF A SWASHPLATE

(75) Inventors: Mark Wiinikka, Hurst, TX (US); Maurice Griffin, Euless, TX (US); Charles Speller, Flower Mound, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 456 days.

(21) Appl. No.: 13/316,061

(22) Filed: Dec. 9, 2011

(65) Prior Publication Data

US 2013/0149150 A1 Jun. 13, 2013

(51) Int. Cl.
*B64C 27/605* (2006.01)

(52) U.S. Cl.
USPC .......................................................... 416/114

(58) Field of Classification Search
USPC .......... 416/134 A, 136, 140, 153, 160, 168 R, 416/170 R; 244/17.25, 17.13, 17.27, 11
See application file for complete search history.

(56) References Cited

U.S. PATENT DOCUMENTS

| | | | | |
|---|---|---|---|---|
| 2,973,815 | A * | 3/1961 | Sznycer | 416/114 |
| 3,841,586 | A * | 10/1974 | Broadley et al. | 244/17.25 |
| 4,930,988 | A | 6/1990 | Griffith | |
| 5,083,725 | A | 1/1992 | Byrnes et al. | |
| 5,135,356 | A | 8/1992 | Shepherd | |
| 5,199,849 | A * | 4/1993 | Leman | 416/114 |
| 5,351,913 | A | 10/1994 | Cycon et al. | |
| 5,599,167 | A | 2/1997 | Daldosso | |
| 5,785,497 | A | 7/1998 | White et al. | |
| 6,152,696 | A * | 11/2000 | Rampal | 416/114 |
| 6,325,326 | B1 | 12/2001 | Pancotti | |
| 7,021,897 | B2 * | 4/2006 | Scala | 416/114 |
| 2008/0267778 | A1 * | 10/2008 | Stamps et al. | 416/148 |
| 2011/0031346 | A1 * | 2/2011 | Allieta et al. | 244/17.13 |

FOREIGN PATENT DOCUMENTS

| | | | |
|---|---|---|---|
| DE | 196 13 462 | 10/1997 | |
| EP | 2 314 507 | 4/2011 | |
| GB | 2 043 010 | 10/1980 | B64C 27/32 |

OTHER PUBLICATIONS

EPO, Munich; Extended Search Report for 12150685.1-2422; 6 pages, Mar. 16, 2012.

(Continued)

*Primary Examiner* — Ninh H Nguyen
*Assistant Examiner* — Eldon Brockman
(74) *Attorney, Agent, or Firm* — Baker Botts L.L.P.

(57) ABSTRACT

According to one embodiment, a rotor system, comprise a mating element, a sleeve, a first swashplate ring, a locking element, and a second swashplate ring. The mating element having a first plurality of grooves a first plurality of ridges. The sleeve is positioned inside the mating element such that the sleeve prevents rotation of the mating element about the sleeve while allowing the mating element to translate along the sleeve. The sleeve has a second plurality of grooves mating with the first plurality of ridges and a second plurality of ridges mating with the first plurality of grooves. The first swashplate ring is positioned around the mating element, and the locking element prevents. the first swashplate ring from rotating about the sleeve. The second swashplate ring is rotatable about the sleeve.

20 Claims, 6 Drawing Sheets

(56) References Cited

OTHER PUBLICATIONS

Canadian Intellectual Property Office, Communication dated Apr. 25, 2014, regarding Canadian Application No. 2,798,339. May 21, 2014.

European Patent Office, Communication pursuant to Article 94(3) EPC, Application No. 12150685.1-1754, dated Sep. 17, 2014 (4 pages).

* cited by examiner

PREVENTING ROTATION OF A FIXED RING OF A SWASHPLATE

TECHNICAL FIELD

This invention relates generally to rotor systems, and more particularly, to preventing rotation of a fixed ring of a swashplate.

BACKGROUND

A helicopter may include one or more rotor systems. One example of a helicopter rotor system is a main rotor system. A main rotor system may generate aerodynamic lift to support the weight of the helicopter in flight and thrust to counteract aerodynamic drag and move the helicopter in forward flight. Another example of a helicopter rotor system is a tail rotor system. A tail rotor system may generate thrust in the same direction as the main rotor system's rotation to counter the torque effect created by the main rotor system.

SUMMARY

According to one embodiment, a rotor system, comprise a mating element, a sleeve, a first swashplate ring, a locking element, and a second swashplate ring. The mating element having a first plurality of grooves a first plurality of ridges. The sleeve is positioned inside the mating element such that the sleeve prevents rotation of the mating element about the axis of the sleeve while allowing the mating element to translate along the axis of the sleeve. The sleeve has a second plurality of grooves mating with the first plurality of ridges and a second plurality of ridges mating with the first plurality of grooves. The first swashplate ring is positioned around the mating element, and the locking element prevents the first swashplate ring from rotating about the axis of the sleeve while allowing it to tilt about an axis that is transverse to the axis of the sleeve. The second swashplate ring is rotatable about the sleeve.

Particular embodiments of the present disclosure may provide one or more technical advantages. A technical advantage of one embodiment may include the capability to reduce the height of the aircraft and the diameter of the swashplate of a rotor system thereby reducing the empty weight of the aircraft. A technical advantage of one embodiment may include the capability to prevent rotation of a non-rotating swashplate ring while allowing the non-rotating swashplate ring to still tilt and slide. A technical advantage of one embodiment may also include the capability to prevent the non-rotating swashplate ring from rotating while allowing the rotating swashplate ring to rotate with the rotor blades.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
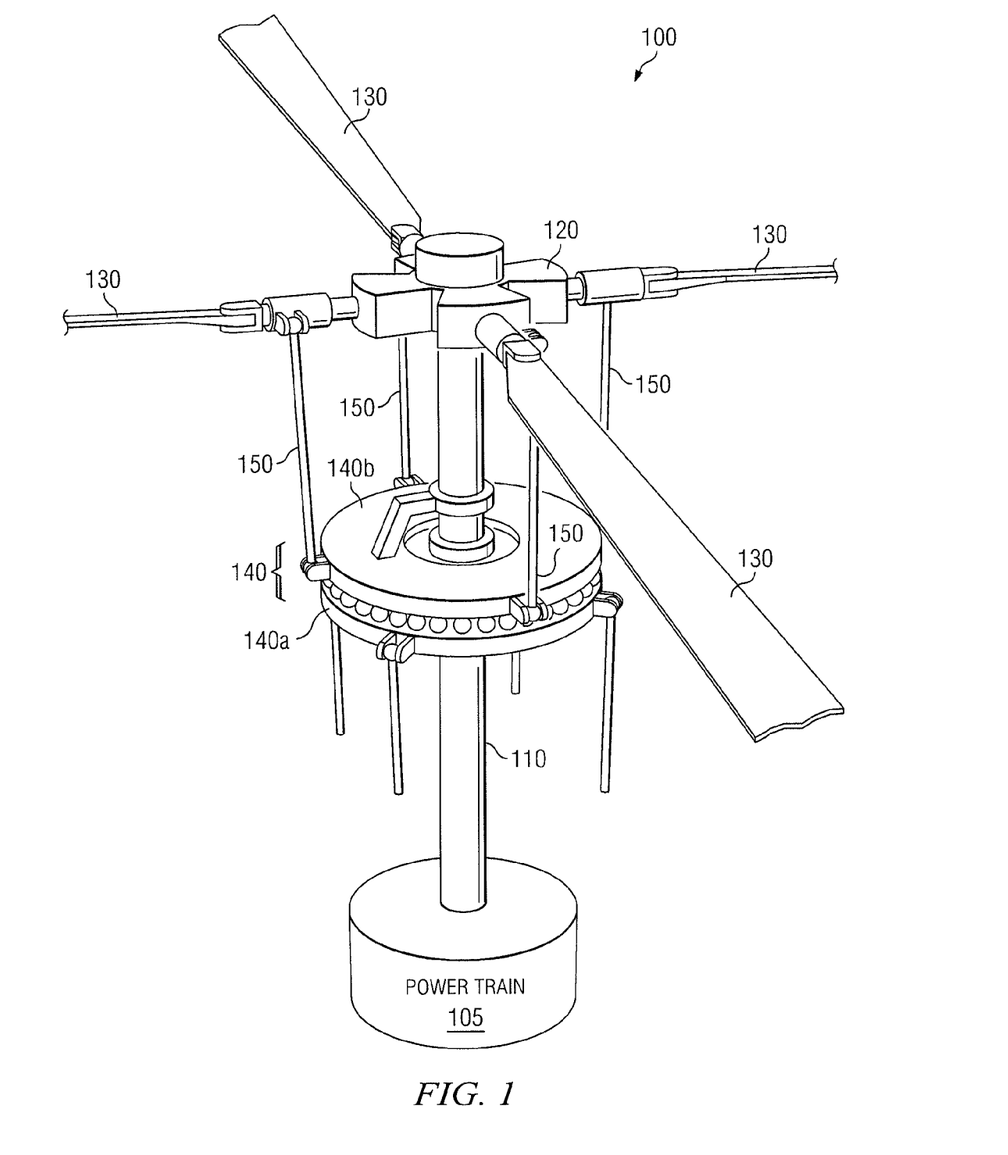
FIG. 1 shows an example helicopter rotor assembly 100.

FIG. 1 shows an example helicopter rotor assembly 100. Helicopter rotor assembly 100 represents a simplified version of the helicopter rotor assembly of FIG. 2.

In FIG. 1, helicopter rotor assembly 100 includes a power train 105, a drive shaft 110, a rotor hub assembly 120, blades 130, a swashplate 140, and pitch links 150. In some examples, helicopter rotor assembly 100 may include more or fewer components. For example, FIG. 1 does not show components such as a gearbox, a yoke, drive links, drive levers, and other components, such as those illustrated in the rotor assembly of FIG. 2, that may be incorporated.

Power train 105, drive shaft 110, and rotor hub assembly 120 are mechanical components for transmitting torque and/or rotation. Power train 105 may include a variety of components, including an engine, a transmission, and differentials. In operation, drive shaft 110 receives torque or rotational energy from power train 105 and rotates rotor hub assembly 120. Rotation of rotor hub assembly 120 causes blades 130 to rotate about drive shaft 110.

Swashplate 140 translates helicopter flight control input into motion of blades 130. Because blades 130 are typically spinning when the helicopter is in flight, swashplate 140 may transmit flight control input from the non-rotating fuselage to the rotating drive assembly 120 and/or blades 130.

In some examples, swashplate 140 may include a non-rotating swashplate ring 140a and a rotating swashplate ring 140b. Non-rotating swashplate ring 140a does not rotate with drive shaft 110, whereas rotating swashplate ring 140b does rotate with drive shaft 110. In the example of FIG. 1, pitch links 150 connect rotating swashplate ring 140b to blades 130.

In operation, according to one example embodiment, translating the non-rotating swashplate ring 140a along the axis of drive shaft 110 causes the pitch links 130 to move up or down. This changes the pitch angle of all blades equally, increasing or decreasing the thrust of the rotor and causing the aircraft to ascend or descend. Tilting the non-rotating swashplate ring 140a causes the rotating swashplate 140b to tilt, moving the pitch links up and down cyclically as they rotate with the drive shaft. This tilts the thrust vector of the rotor, causing the aircraft to translate horizontally following the direction the swashplate is tilted.

In the example of FIG. 1, non-rotating swashplate ring 140a should not rotate with drive shaft 110, whereas rotating swashplate ring 140b should rotate with drive shaft 110. Teachings of certain embodiments provide the capability to prevent a non-rotating swashplate ring from rotating while allowing the rotating swashplate ring to rotate with the rotor blades. A particular embodiment is described below with regard to FIGS. 2 through 6.

Figure 2:
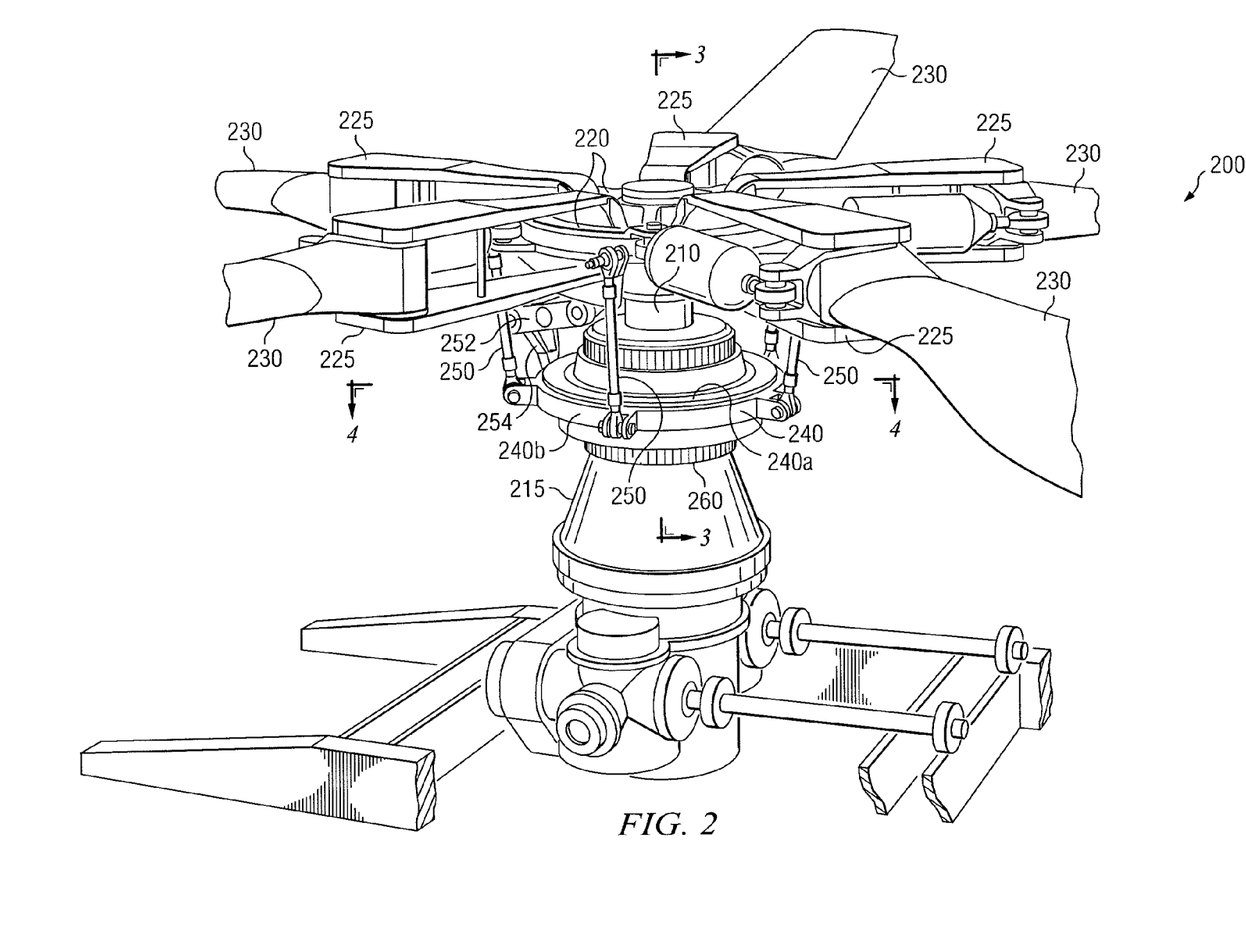
FIG. 2 shows a rotor system according to one example embodiment.

FIG. 2 shows a rotor system 200 according to one example embodiment. Rotor system 200 features a drive shaft 210, a gearbox 215, a yoke 220, grips 225, blades 230, a swashplate 240 having a non-rotating swashplate ring 240a and a rotating swashplate ring 240b, pitch links 250, drive levers 252, drive links 254, and a sleeve 260. Additional details of rotor system 200 are described in greater detail with regard to FIGS. 3-6.

Drive shaft 210, yoke 220, grips 225, drive levers 252, and drive links 254 are mechanical components for transmitting torque and/or rotation. In rotor system 200, grips 225 couple blades 230 to yoke 220, which is coupled to drive shaft 210. Drive levers 252 and drive links 254 couple yoke 220 to rotating swashplate ring 240b. In operation, drive shaft 210 receives torque or rotational energy and rotates yoke 220. Rotation of yoke 220 causes grips 225 to rotate blades 230 and causes drive levers 252 and drive links 254 to rotate rotating swashplate ring 240b.

Swashplate 240 translates flight control input into motion of blades 230. Because blades 230 are typically spinning when the helicopter is in flight, swashplate 240 may transmit flight control input from the non-rotating fuselage to the rotating yoke 220, grips 225, and/or blades 230.

Swashplate 240 includes a non-rotating swashplate ring 240a and a rotating swashplate ring 240b. Non-rotating swashplate ring 240a and rotating swashplate ring 240b are shown in greater detail with regard to FIGS. 3-6. Non-rotating swashplate ring 240a does not rotate with drive shaft 210, whereas rotating swashplate ring 240b does rotate with drive shaft 210. Rotating swashplate ring 240b may be coupled to blades 230 via pitch links 250, which allow rotating swashplate ring 240b to control deflection of blades 230. In operation, translating or tilting non-rotating swashplate ring 240a causes rotating swashplate ring 240b to translate or tilt, which in turn moves pitch links 250 up and down.

Sleeve 260 is coupled to and around gearbox 215. In the illustrated embodiment, sleeve 260 is substantially cylindrical. Gearbox 215 surrounds drive shaft 210 and separates rotating drive shaft 210 from non-rotating components such as sleeve 260 and non-rotating swashplate ring 240a.

Sleeve 260 prevents non-rotating swashplate ring 240a from rotating with drive shaft 210. In some embodiments, using sleeve 260 to prevent rotating of non-rotating swashplate ring 240a may allow for a shorter rotor system 200. For example, in some embodiments, sleeve 260 may eliminate the need to externally couple non-rotating swashplate ring 240a directly to gearbox 215. If non-rotating swashplate ring 240a is not coupled directly to gearbox 215, then the overall size and height of rotor system 200 may be reduced.

Figure 3:
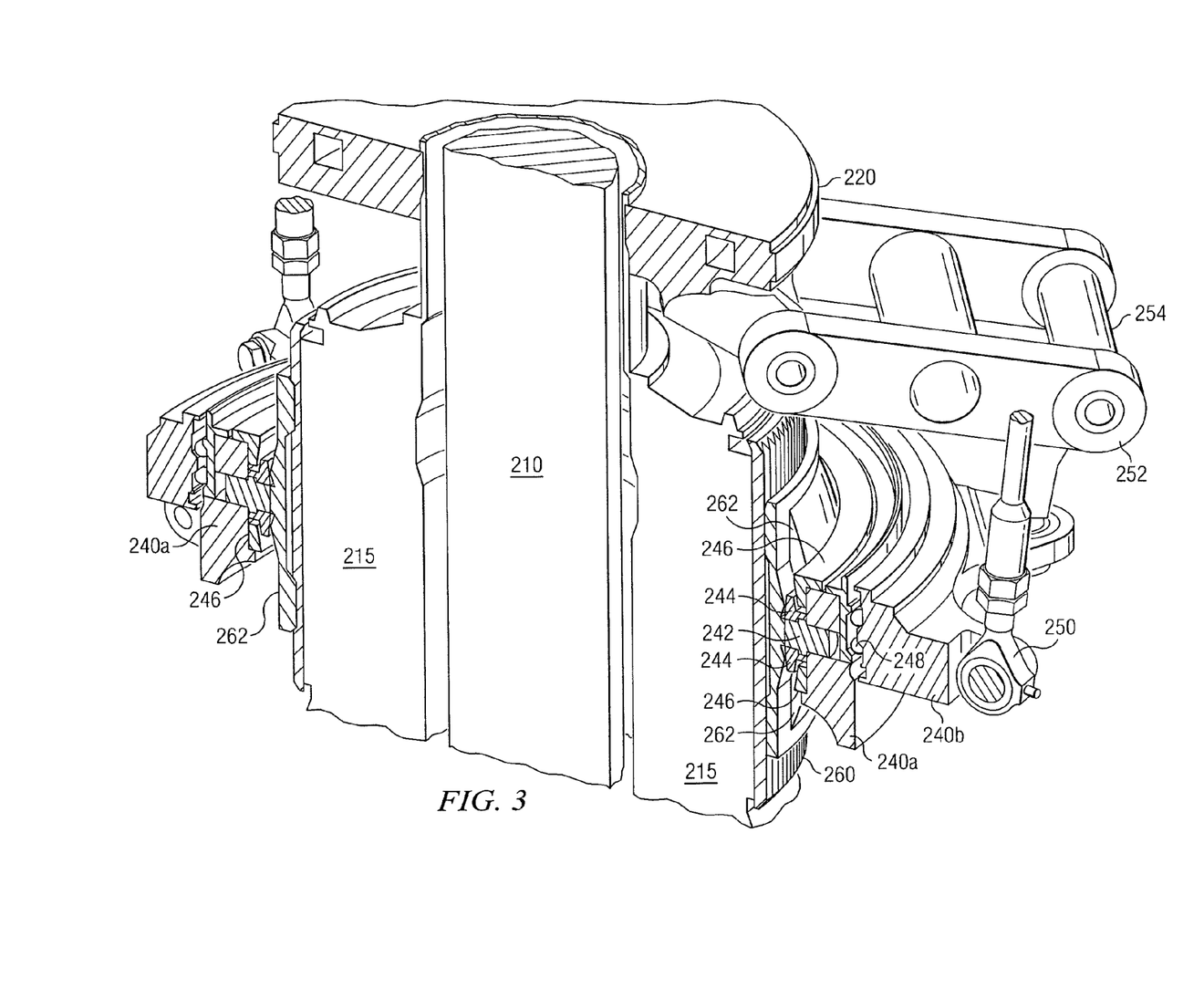
FIG. 3 shows a longitudinal cross-section of the rotor system of FIG. 2.

FIG. 3 shows a longitudinal cross-section of the rotor system 200 of FIG. 2. As shown in FIG. 3, mating element 262 surrounds and mates to sleeve 260. In operation, sleeve 260 prevents rotation of mating element 262 about gearbox 215. Sleeve 260 may also allow mating element 262 to move longitudinally up and down sleeve 260. The mating of sleeve 260 to mating element 262 is described in greater detail with regard to FIGS. 4 and 5.

Non-rotating swashplate ring 240a is positioned around mating element 262. In the example of FIG. 3, pin 242 and key 244 prevent non-rotating swashplate ring 240a from rotating about the longitudinal axis of mating element 262 while allowing it to tilt about an axis transverse to the longitudinal axis of the mating element. In this example, key 244 fits within an opening in mating element 262. Key 244 is configured to receive pin 242. Non-rotating swashplate ring 240a also includes openings configured to receive pin 242 such that pin 242 prevents mating element 262 and non-rotating swashplate ring 240a from rotating relative to one another relative to the longitudinal axis. Pin 242 and key 244 are shown in greater detail in FIGS. 4 and 5.

Mating element 262 may include a curved outer surface. This curved outer surface, also known as a "tilt ball," allows swashplate 240 to tilt up and down. As stated above, tilting non-rotating swashplate ring 240a causes rotating swashplate ring 240b to tilt, which in turn moves pitch links 250 up and down and deflects blades 230. Thus, teachings of certain embodiments recognize the capability to prevent rotation of non-rotating swashplate ring 240a while allowing tilting of non-rotating swashplate ring 240a relative to the tilt ball of mating element 262.

Bearing 246 separates mating element 262 and non-rotating swashplate ring 240a. In some embodiments, bearing 246 may prevent non-rotating swashplate ring 240a from wearing against mating element 262. Bearing 246 may be made of any suitable bearing material, such as Teflon.

Rotating swashplate ring 240b is positioned around non-rotating swashplate ring 240a. Bearing 248 separates rotating swashplate ring 240b from non-rotating swashplate ring 240a to prevent wearing and to reduce friction when rotating swashplate ring 240b rotates relative to non-rotating swashplate ring 240a. In operation, rotating swashplate ring 240b rotates with drive levers 252 and drive links 254. Rotating swashplate ring 240b also tilts up and down with non-rotating swashplate ring 240a as non-rotating swashplate ring 240a tilts up and down the curved surface of mating element 262.

Figure 4:
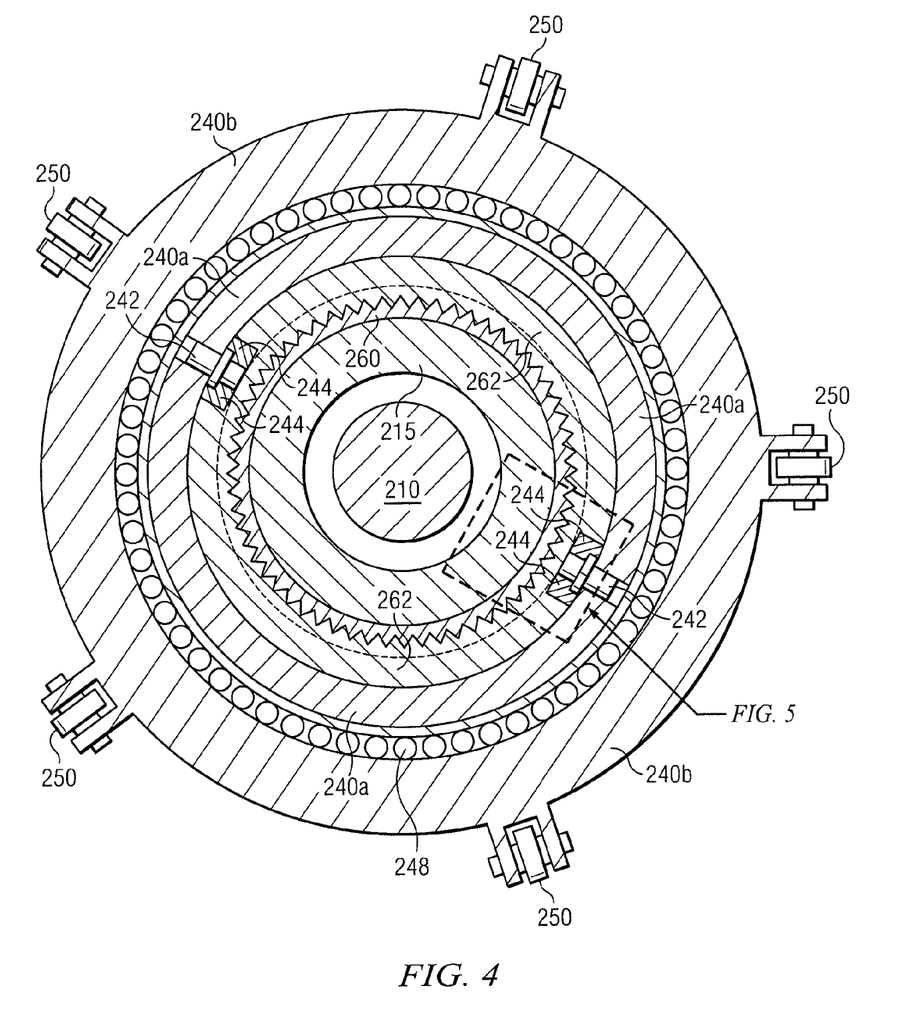
FIG. 4 shows a transverse cross-section of the rotor system of FIG. 2.

FIG. 4 shows a transverse cross-section of the rotor system 200 of FIG. 2. As shown in FIG. 4, gearbox 215 surrounds drive shaft 210. Sleeve 260 is coupled to and around gearbox 215. Mating element 262 mates to sleeve 260 such that sleeve 260 prevents rotation of mating element 262 about gearbox 215. Non-rotating swashplate ring 240a is positioned around mating element 262. Pin 242 and key 244 prevent non-rotating swashplate ring 240a from rotating around gearbox 215. Rotating swashplate ring 240b is positioned around non-rotating swashplate ring 240a and is free to rotate along bearings 248.

As shown in FIG. 4, sleeve 260 includes grooves and ridges that mate with ridges and grooves of mating element 262. In the example of FIG. 4, the grooves and ridges of sleeve 260 alternate continuously about the full outer diameter of sleeve 260, and the grooves and ridges of mating element 262 alternate continuously about the full inner diameter of mating element 262. The ridges and grooves of sleeve 260 and mating element 262 are shown in greater detail in FIG. 5.

In some embodiments, ridges and grooves of sleeve 260 and mating element 262 interlock so as to eliminate open spaces between sleeve 260 and mating element 262. Eliminating open spaces may allow the outer diameter of mating element 262 to be reduced. In turn, reducing the outer diameter of mating element 262 may allow the diameters of non-rotating swashplate ring 242a and rotating swashplate ring 242b to be reduced. Accordingly, teachings of certain embodiments recognize that using mating ridges and grooves may reduce the outer diameter of swashplate 240.

Figure 5:
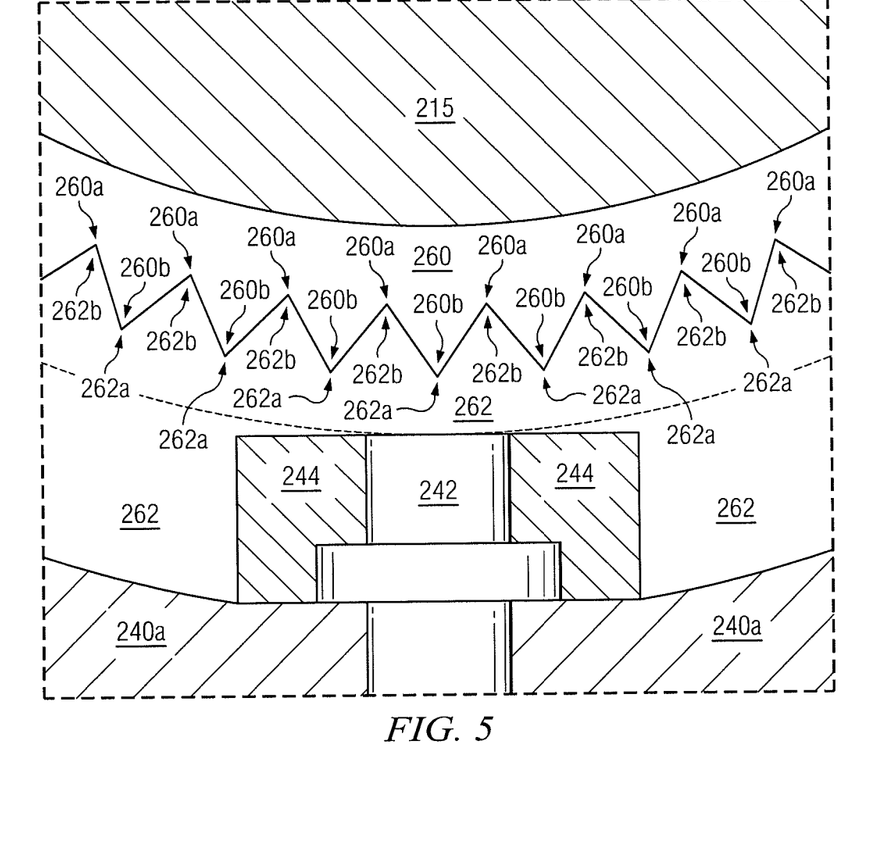
FIG. 5 shows a close view of the transverse cross-section of FIG. 4.

FIG. 5 shows a close view of the transverse cross-section of FIG. 4. As shown in FIG. 5, sleeve 260 features grooves 260a and ridges 260b, and mating element 262 features grooves 262a and ridges 262b. In this example, grooves 260a mate with ridges 262b, and ridges 260b mate with grooves 262a.

In some embodiments, the mating surfaces of sleeve 260 and/or mating element 262 may be treated with a bearing coating to reduce wear and friction between the parts. For example, sleeve 260 and/or mating element 262 may be anodized. Anodization is an electrolytic passivation process used to increase the thickness of the natural oxide layer on the surface of metal parts. In one example embodiment, sleeve 260 and/or mating element 262 may be treated using a process called Keronite, which may produce a hard, dense ceramic surface layer on sleeve 260 and/or mating element 262.

Figure 6:
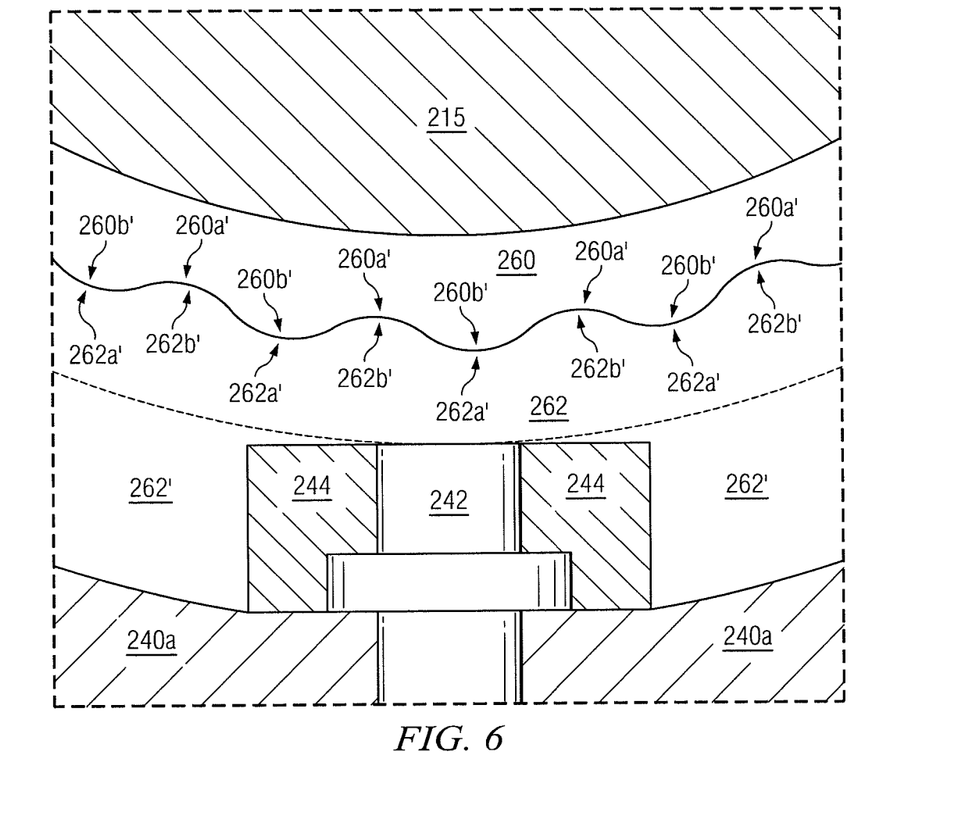
FIG. 6 shows another close view of the transverse cross-section of FIG. 4 according to an alternative embodiment.

In the example of FIG. 5, ridges 260b and 262b have sharp peaks, and grooves 260a and 262a have sharp valleys. Ridges 260a and 260b and grooves 260a and 260b may have a variety of different interlocking shapes. For example, FIG. 6 shows a sleeve 260' having grooves 260a' and ridges 260b' and a mating element 262' having grooves 262a' and ridges 262b'. Unlike the ridges and grooves of FIG. 5, ridges 260b' and 262b' have curved peaks, and grooves 260a' and 262a' have curved valleys. In the example of FIG. 6, grooves 260a' mate with ridges 262b' and grooves 262a' mate with ridges 260b' so as to prevent mating element 262' from rotating about sleeve 260'.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

What is claimed is:

1. A rotor system, comprising:
   a gearbox;
   a mating element having a first plurality of grooves and a first plurality of ridges;
   a sleeve coupled to and around the gearbox and positioned inside the mating element such that the sleeve prevents rotation of the mating element about the sleeve, the sleeve having a second plurality of grooves mating with the first plurality of ridges and a second plurality of ridges mating with the first plurality of grooves;
   a first swashplate ring positioned around the mating element;
   a locking element preventing the first swashplate ring from rotating about the axis of the sleeve; and
   a second swashplate ring rotatable about the sleeve.

2. The rotor system of claim 1, further comprising a gearbox, wherein the sleeve is coupled to and around the gearbox.

3. The rotor system of claim 1, wherein the second plurality of grooves and the second plurality of ridges alternate continuously about the sleeve.

4. The rotor system of claim 1, wherein:
   the mating element comprises a curved surface; and
   the first swashplate ring is pivotable along the curved surface.

5. The rotor system of claim 1, further comprising a key element positioned in an opening of the mating element and configured to receive the locking element.

6. The rotor system of claim 1, wherein the plurality of first ridges comprises at least five ridges.

7. The rotor system of claim 1, wherein the mating element is configured to slide axially relative to the sleeve.

8. A helicopter, comprising:
   a power train operable to rotate a drive shaft;
   a plurality of rotor blades operable to rotate in response to rotation of the drive shaft;
   a gearbox surrounding a portion of the drive shaft;
   a mating element having a first plurality of grooves and a first plurality of ridges;
   a sleeve coupled to and around the gearbox and positioned inside the mating element such that the sleeve prevents rotation of the mating element about the sleeve, the sleeve having a second plurality of grooves mating with the first plurality of ridges and a second plurality of ridges mating with the first plurality of grooves;
   a first swashplate ring positioned around the mating element;
   a locking element preventing the first swashplate ring from rotating about the sleeve; and
   a second swashplate ring rotatable about the sleeve with rotation of the plurality of rotor blades.

9. The helicopter of claim 8, wherein the second plurality of grooves and the second plurality of ridges alternate continuously about the sleeve.

10. The helicopter of claim 8, wherein:
    the mating element comprises a curved surface; and
    the first swashplate ring is pivotable along the curved surface.

11. The helicopter of claim 8, further comprising a key element positioned in an opening of the mating element and configured to receive the locking element.

12. The helicopter of claim 8, wherein the plurality of first ridges comprises at least five ridges.

13. The helicopter of claim 8, wherein the mating element is configured to slide axially relative to the sleeve.

14. A swashplate rotor system, comprising:
    a gearbox;
    a mating element having a first plurality of grooves and a first plurality of ridges;
    a sleeve coupled to and around the gear box and positioned inside the mating element such that the sleeve prevents rotation of the mating element about the sleeve, the sleeve having a second plurality of grooves mating with the first plurality of ridges and a second plurality of ridges mating with the first plurality of grooves.

15. The rotor system of claim 14, wherein the second plurality of grooves and the second plurality of ridges alternate continuously about the sleeve.

16. The rotor system of claim 14, wherein the plurality of first ridges comprises at least five ridges.

17. The rotor system of claim 14, wherein the mating element is configured to slide axially relative to the sleeve.

18. The rotor system of claim 14, further comprising:
    a first swashplate ring positioned around the mating element;
    a locking element preventing the first swashplate ring from rotating about the sleeve; and
    a second swashplate ring rotatable about the sleeve with rotation of the plurality of rotor blades.

19. The rotor system of claim 18, wherein:
    the mating element comprises a curved surface; and
    the first swashplate ring is pivotable along the curved surface.

20. The rotor system of claim 18, further comprising a key element positioned in an opening of the mating element and configured to receive the locking element.

* * * * *